Aug. 31, 1937.  A. W. PRANCE  2,091,489
LAMP ASSEMBLY
Filed March 30, 1936
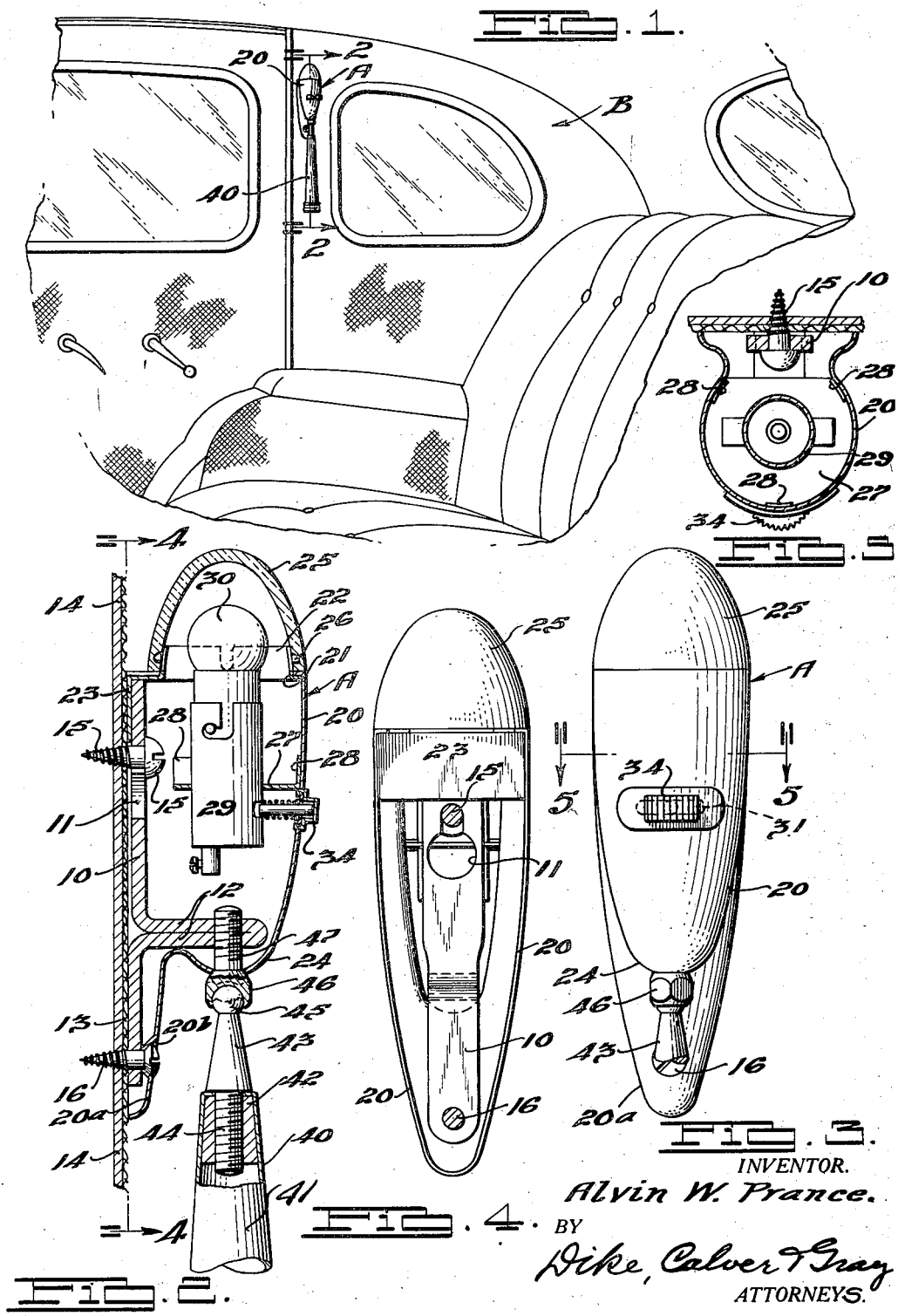
INVENTOR.
Alvin W. Prance.
BY
Dike, Calver & Gray
ATTORNEYS.

Patented Aug. 31, 1937

2,091,489

UNITED STATES PATENT OFFICE 2,091,489

LAMP ASSEMBLY

Alvin W. Prance, Pleasant Ridge, Mich., assignor to Briggs Manufacturing Company, Detroit, Mich., a corporation of Michigan Application March 30, 1936, Serial No. 71,581

9 Claims. (Cl. 240—7.1)

This invention relates to ornamental lamp assemblies adapted particularly, although not exclusively, for use in the interiors of vehicle bodies, and more especially to a combined lamp and hand hold or assist cord structure adapted to be mounted upon the interior wall of the body.

One of the objects of the present invention is to provide an improved lamp assembly and assist cord structure having a common supporting bracket or mounting for attaching the assembly to a supporting surface, and one in which the lamp casing is so constructed and arranged as to be free from the strains and forces exerted upon the assist cord.

Another object of the invention is to provide an improved lamp assembly in which the mounting or bracket therefor is entirely concealed by the lamp casing, such bracket providing a means for the attachment of an assist cord.

Another object of the invention is to provide an improved lamp assembly of the foregoing character in which any strains and forces applied to the assist cord are transmitted to and taken by the supporting surface upon which the lamp assembly is mounted, such, for example, as the frame structure of a vehicle body.

Another object of the invention is to provide a lamp assembly which is of comparatively simple construction and in which the various parts thereof are capable of easy and quick assembly, and one which can be attached to or removed from its supporting surface or member with ease and facility.

The above and other objects and advantages of the invention will appear from the following description and appended claims when considered in connection with the accompanying drawing forming a part of this specification.

In said drawing:

Fig. 1 is a fragmentary perspective view of the interior or rear tonneau of a vehicle body of the enclosed type, embodying one form of the present invention.

Fig. 2 is a vertical section, on an enlarged scale, taken substantially along the line 2—2 of Fig. 1, looking in the direction of the arrows.

Fig. 3 is a front elevation, partly broken away, of the lamp assembly of Figs. 1 and 2.

Fig. 4 is a rear elevation taken substantially along the line 4—4 of Fig. 2, looking in the direction of the arrows; and Fig. 5 is a horizontal section, taken substantially along the line 5—5 of Fig. 3, looking in the direction of the arrows.

Before explaining in detail the present invention it is to be understood that the invention is not limited in its application to the details of construction and arrangement of parts illustrated in the accompanying drawing, since the invention is capable of other embodiments and of being carried out in various ways. Also it is to be understood that the phraseology or terminology employed herein is for the purpose of description and not of limitation, and it is not intended to limit the invention claimed herein beyond the requirements of the prior art.

Referring now particularly to the drawing, one form of lamp assembly embodying the invention is shown in one of its applications, namely as applied to the interior of an automobile body. The lamp assembly of the present form of the invention is shown as a whole at A and is applied, as illustrated in Fig. 1, to a rear quarter panel B or to the adjacent door pillar. The assembly, as shown, comprises a combined metal supporting bracket or mounting and force transmitting member 10 formed preferably of bar or strip steel and has formed in its upper vertical leg or section an inverted key-hole slot 11. The bracket is bent or shaped to provide reversely extending substantially horizontal portions 12 which are threaded to receive and removably support a hand hold or assist cord 40 fully described hereinafter. The bracket, below the portions 12, extends downwardly in a vertical plane to provide a lower leg or base portion 13. The bracket is adapted to be mounted upon a wall or body frame member, such as the panel or pillar 14, into which a metal screw 15 is threaded (Fig. 2). The enlarged portion of the key-hole slot 11 of the bracket is brought into register with and slipped over the head of the screw 15. The bracket is then slid downwardly to removably support it in place upon the screw shank. A second metal screw 16 is then inserted in an opening formed in the bracket leg 13 and threaded into the plate 14 to secure the lower end of the bracket in place. Thus, the bracket is removably locked upon or attached to the support 14. The screw 16 serves the dual purpose of holding the assembly in place upon the support, and also the lamp casing and bracket in assembled relation.

The lamp casing or housing of the assembly is shown as a whole at 20 and in the present form, as shown, is of the so-called tear drop design, preferably formed of sheet metal and having front and side walls and an open back. Set into the top of the casing and preferably welded or soldered thereto, is a ring or sleeve member 21 having an upstanding annular flange 22 and a depending rear portion or flange 23. The casing is assembled with the bracket 10. The back wall portion or flange 23 when assembled with said bracket and mounted upon the support 14, is located between the upper leg of the bracket 10 and the said support or frame member 14, so as to be clamped therebetween when the screws 15 and 16 are tightened down, as seen in Fig. 2. If desired, the flange 23 may be attached to the bracket 10 in any other suitable manner. The annular flange 22 provides a socket which cooperates with and supports a cap or dome 25 formed of suitable translucent material, such for example, as frosted glass, celluloid or the like. The flange 22 has external projections or lugs 26 which cooperate with a groove or bayonet slot formed in the cover or dome 25 so as to releasably lock the dome in place upon the casing.

The interior of the casing 20, as shown, is provided with a substantially centrally located horizontal partition or web 27 having spaced lugs or flanges 28 (Figs. 2 and 6) which may be attached to the casing in any suitable manner, as by welding. The partition has a central hole or opening to receive and support a conventional lamp socket or casing 29 provided with a lamp bulb 30.

The front wall of the casing 20 has formed therein a horizontal or transverse slot or opening 31. A switch operating member 34 has a stem which projects through the casing slot 31 and engages a switch (not shown) located within the socket member 29. Sliding movement of the switch button or operator 34 over the face of the casing switches on and off the lamp bulb.

The lower portion of the casing 20 is rounded or dome-shaped as at 24 and provided with an aperture or opening which, when the parts are assembled, is in vertical alinement with a threaded opening in the reversely bent horizontal portion 12 of the supporting bracket. The tapered and inwardly offset lower end portion 20a of the casing, beyond the rounded or bowl portion 24, is depressed or countersunk to provide a countersunk recess 20b having a central opening to receive the screw 16, see Fig. 2.

The hand hold or assist cord, forming a part of the lamp assembly, is shown as a whole at 40 and comprises a gripping portion 41 having a ferrule 42 which provides a socket to receive the threaded stem 44 of the tapered head portion 43 of the hand grip or handle. The free end of the portion 43 is in the form of a ball 45 adapted to fit within a socket 46 carried by or formed on the threaded stem 47. The socket 46 may be in the form of an adjustable nut threaded onto the stem 47. The hand hold or assist cord is attached to the supporting bracket 10, by passing the threaded stem 47 through the hole or aperture formed in the portion 24 of the casing and threading it into the hole or opening located in the two parallel horizontal portions 12 of the bracket. By virtue of this construction and assembly of the parts, any pulling force or strain applied to the hand hold 40 is taken directly by the bracket 10 and transmitted to the frame member 14, thus relieving the casing and other parts of the lamp assembly of all such forces and strains.

The lamp assembly above described may be installed upon a supporting surface, such for example, as the rear quarter panel B or the door pillar, as follows: The lamp casing 20 and the combined supporting bracket and force transmitting member 10, together wtih the assist cord 40, are already assembled as a unit, with the threaded end 47 of the assist cord 40 engaging the alined holes in the horizontal portions 12 of the bracket. The enlarged portion of the key-hole slot 11 is then brought into register with the head of the metal screw 15 which has been previously applied to the supporting member or panel 14. The casing is moved toward the supporting panel and thence downwardly until the narrow portion of the key-hole slot engages the shank of the screw, the head of said screw overlapping the side edges of the slot to hold the bracket in place. The metal screw 16 is then passed through preformed registering openings in the casing portion 20a and the leg portion 13 of the bracket or mounting and threaded into the supporting member 14. By reason of the countersunk socket 20b formed in the casing, the head of the screw will be flush with the face of the casing and thus present a smooth surface. It will be seen that the bracket or mounting 10 is completely concealed by the casing or housing 20. To remove the lamp assembly from the panel B, it is merely necessary to remove the screw 16, slide the entire casing upwardly until the head of the screw 15 registers with the enlarged portion of the key-hole slot 11 and the whole fixture or assembly withdrawn outwardly.

Assuming that the lamp casing 20, the assist cord 40, and the bracket 10 are not assembled as a unit, these parts would be applied to the supporting surface 14 in the following manner: The metal screw 15 is first threaded into the supporting surface after which the mounting 10 is applied thereto as described above. Thereafter, the casing 20 may be attached to the mounting by inserting its back wall or flange 23 into the space between the upper end of the member 10 and the supporting surface 14. When the casing is thus applied to the mounting 10, the opening formed in the rounded portion 24 thereof will be in alinement with the threaded hole or opening in the bracket portions 12. The metal screw 16 may then be inserted through the alined openings formed in the portion 20a of the casing and the lower leg 13 of the mounting or bracket and threaded into the supporting plate 14 to hold the assembly firmly against the supporting surface. The head of the screw 16 seats within the socket 20b of the casing. The assist cord may then be applied to the assembly by passing the threaded stem 47 thereof through the opening in the casing and threading it into the horizontal portions 12 of the bracket.

From the foregoing it will be seen that I have provided a lamp assembly which combines the feature of interior body lighting with means for assisting the occupant of the vehicle to rise from the vehicle seat. The lamp assembly herein illustrated is of comparatively simple construction, ornamental, relatively inexpensive to manufacture and easy to assemble and disassemble and to apply to and remove from its supporting surface.

I claim:

1. A lamp assembly for use in the interior of a vehicle body, comprising a casing and an assist cord, and a common mounting for said casing and assist cord concealed by said casing for removably applying the assembly to a supporting surface, said mounting also serving to transmit directly to the supporting surface pulling strains and forces applied to the assist cord.

2. A lamp assembly adapted for application to a supporting surface, comprising a casing and an assist cord associated therewith, and a mounting for said casing and assist cord located within the casing for removably attaching the assembly to a supporting surface, said mounting providing means for transmitting forces from said hand hold directly to the supporting surface independently of the casing.

3. A lamp assembly adapted to be removably mounted upon a supporting surface, comprising a casing and a hand grip member, and common means for supporting the casing and member in position upon said support, said means being enclosed at least in part by the casing and serving to transmit forces applied to said member to the supporting surface independently of said casing.

4. A lamp assembly adapted to be removably mounted upon a supporting surface, comprising a casing and a hand hold, common means for supporting the casing and hand hold in position upon said support, said means serving to transmit forces applied to said hand hold to the supporting surface independently of said casing, said casing having an open top, and a removable translucent closure for said opening.

5. A lamp assembly adapted to be removably mounted upon a supporting surface in upright position, comprising a casing and a hand hold, and a common mounting for said casing and hand hold for applying them to said support, said mounting having an upright base portion engaging the support and an outwardly projecting portion located within said casing adjacent the bottom thereof to receive and removably support the hand hold, whereby to receive forces applied to said hand hold and transmit them directly to said supporting surface.

6. A lamp assembly adapted to be removably mounted upon a supporting surface in upright position, comprising a casing and a hand hold, and a common mounting for said casing and hand hold for applying them to said support, said mounting having an upright base portion engaging the support and an outwardly projecting portion located within said casing adjacent the bottom thereof, said projecting portion having an opening and said casing having a corresponding opening formed therein below and in substantial vertical alinement with the casing opening to permit the hand hold to be engaged with said mounting, whereby to transmit forces applied to the hand hold directly to said supporting surface independently of said casing.

7. A lamp assembly adapted to be removably attached to an upright supporting surface, comprising a metal casing having a source of light therein and an open top, a removable translucent cap for closing said opening, a metallic mounting for said lamp assembly for attaching the same to said supporting surface, said mounting being shaped to provide upright base portions engaging the supporting surface and reversely bent forwardly projecting portions located within said casing and having a threaded opening formed therein, the base of said casing having an opening in registry with said first named opening, and a removable hand hold adapted to be passed through said casing opening and threadedly engaged with the opening in said offset portion whereby to removably support the hand hold.

8. A lamp and assist cord assembly, comprising a fixed mounting bracket, a lamp casing enclosing said bracket, and an assist cord having a part projecting through said casing and attached to said bracket and effective to transmit forces to the bracket substantially independently of the casing.

9. A lamp and assist cord assembly, comprising a fixed mounting bracket, a lamp casing enclosing and concealing said bracket and supported thereby, and an assist cord secured to the bracket interiorly of the casing whereby forces applied to the assist cord are transmitted to the bracket substantially independently of the casing.

ALVIN W. PRANCE.